March 31, 1959 — E. F. ROSSMAN — 2,879,795
CONTROL MECHANISM
Filed May 2, 1956
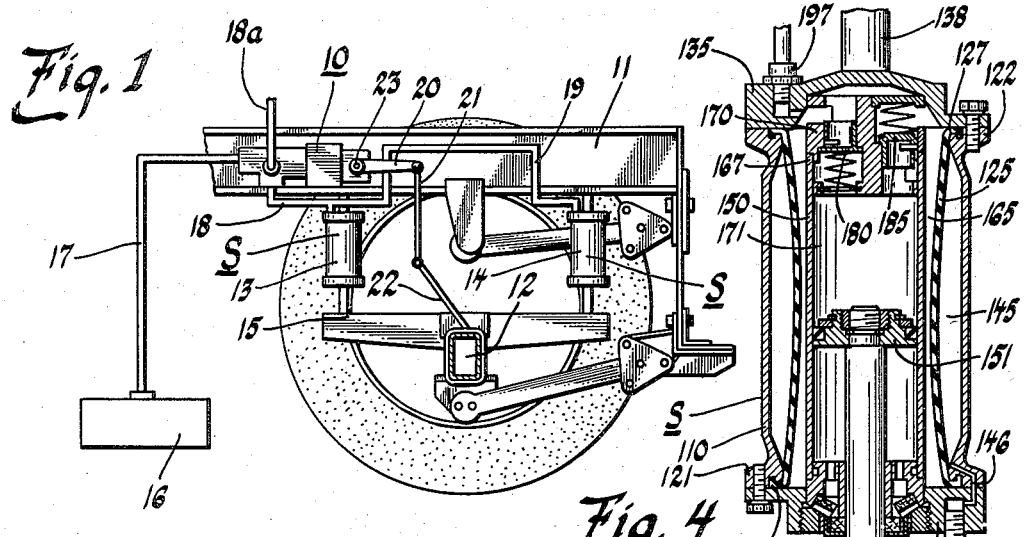
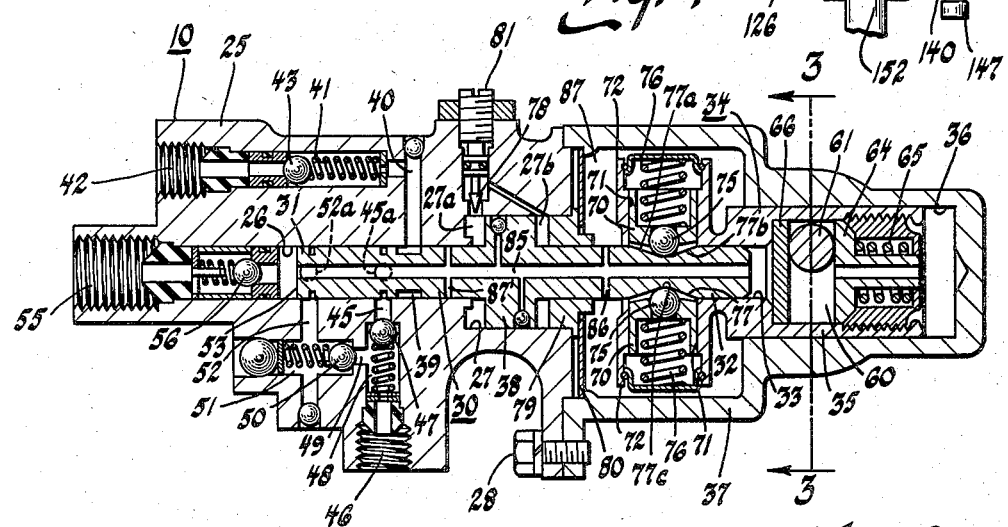
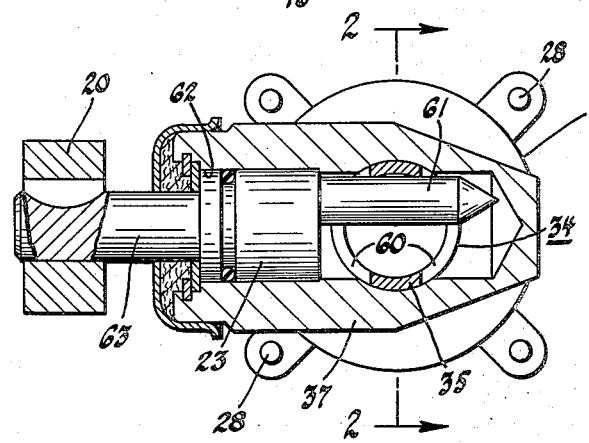
INVENTOR.
Edwin F. Rossman
BY
HIS ATTORNEY

United States Patent Office 2,879,795
Patented Mar. 31, 1959

2,879,795
CONTROL MECHANISM

Edwin F. Rossman, Dayton, Ohio, assignor to General Motors Corporation, Detroit, Mich., a corporation of Delaware Application May 2, 1956, Serial No. 582,242

6 Claims. (Cl. 137—596)

This invention relates to an improved control device for regulating supply of oil to a hydro-pneumatic suspension unit for a motor vehicle and exhaust of oil from the unit.

The invention is specially adapted for controlling a supply and exhaust of oil to and from a hydro-pneumatic suspension unit to maintain a relatively constant clearance between the running gear and the chassis of the vehicle. The suspension unit may be in the form of a dual chambered cylinder with the chambers separated by a resilient wall with one of the chambers containing a body of liquid, such as oil, that is supported by the resilient wall which in turn is supported by a gaseous pressure charge, such as air, in the other chamber, the said other chamber being inflated or charged under pressure sufficient to support the body of the vehicle above the axle, the air within the chamber providing for resilient support of the body on the running gear of the vehicle.

The hydro-pneumatic spring is placed between the body and the running gear of the vehicle in much the same manner as other spring or suspension units with the result that the total movement between the body of the vehicle and the axle is limited due to various construction arrangements. It is desirable to maintain the body or chassis of the vehicle at a relatively constant height position relative to the axle, or the ground. However, since passenger vehicles are subject to rather wide load variations, it is obvious that when the load increases in a previously empty vehicle that the resilient spring will allow the body to move downwardly relative to the axle of the vehicle. This is true with conventional mechanical springs and it is also true with respect to hydro-pneumatic springs, the air chamber in the spring being placed under a greater degree of compression with the resultant lowering of the chassis relative to the axle of the vehicle.

If the hydro-pneumatic springs are charged with an air pressure having a value sufficient to maintain a predetermined clearance distance between the body and the axle of the vehicle under a relatively light load condition, the pressure of the fluid in the spring is insufficient to sustain a heavy load condition without a resultant lowering of the body relative to the axle of the vehicle and under extreme conditions of having the body strike the axle. As the load condition increases it therefore becomes desirable to increase the volume of oil in the oil chamber of the hydro-pneumatic spring to sustain the heavier load if the clearance distance between the axle of the vehicle and the body is to remain the same as when the vehicle carried a light load.

Obviously, reverse conditions must be effected when the load in a body is lightened from a previous heavy load condition, that is, the volume of oil in the spring must be reduced by exhausting some of the oil from the oil chamber of the spring to allow the body of the vehicle to remain at a predetermined clearance height relative to the axle.

To accomplish the foregoing result a control mechanism is provided that is connected to the axle of the motor vehicle in such a manner that movement of the car body toward the axle of the vehicle will result in delivery of oil under pressure into the spring. A raising of the car body relative to the axle, resulting from a lightening of the load with the car body, will cause the control mechanism to effect an exhaust of oil from the spring so that the car body will remain at a relatively fixed clearance height relative to the car axle.

It is therefore an object of this invention to provide an improved control mechanism for regulating the supply of oil under pressure to a hydro-pneumatic spring and exhaust of oil from the spring in response to relative movement between the car body and the car axle, the control mechanism being constructed and arranged in such a manner that road vibrations of the running gear relative to the car body will not effect a change of the extended condition of the spring, the control mechanism being responsive to supply or exhaust of oil from the spring only in response to those movements of the car body or chassis relative to the car axle that represent an increase or decrease of load condition or change in static height clearance.

Further objects and advantages of the present invention will be apparent from the following description, reference being had to the accompanying drawings wherein a preferred form of the invention is clearly shown.

In the drawings:

Figure 1 is an elevational view of a portion of the running gear of a vehicle incorporating the control mechanism of this invention.

Figure 2 is a longitudinal cross sectional view of the control mechanism.

Figure 3 is a transverse cross sectional view of the control mechanism taken along line 3—3 of Figure 2.

Figure 4 is a vertical cross sectional view of a hydro-pneumatic suspension unit adaptable for use with this invention.

A hydro-pneumatic suspension unit adapted for use with the control device of this invention is illustrated in Figure 4.

The suspension unit S comprises an outer housing cylinder 110. Within the housing cylinder 110 there is disposed an expansible tubular member 125 that is preferably constructed of a rubber-like material. The tubular member 125 has the opposite ends 126 and 127 thereof engaging the radial flanges 121 and 122 respectively of the housing 110.

A closure member 135 is provided on the flange portion 122 of the housing cylinder 110, whereby the end 127 of the tubular wall 125 is retained in sealing engagement with the flange portion 122 of the housing 110. The closure member 135 has a mounting member 138 extending therefrom adapted to be connected with a stationary part of the chassis of a vehicle.

The opposite end of the cylinder housing 110 carries a closure member 140 secured to the flange portion 121 of the housing 110 whereby the end 126 of the expansible tubular wall 125 is retained in sealing engagement with the flange portion 121 of the housing 110.

The structural arrangement thus described provides a sealed or closed chamber 145 between the housing cylinder 110 and the tubular expansible wall 125 that receives a gaseous fluid medium under pressure introduced into the chamber 145 through a passage 146 and an inlet valve 147.

The closure member 140 supports one end of a shock absorber cylinder 150 in which there is slidably disposed a piston 151. The piston 151 has an operating rod 152 that projects through the closure member 140 for attachment to the axle or unsprung element of a vehicle.

The end 167 of the cylinder 150 carries a closure member 170 thereby providing a chamber 171 between the closure member 170 and the piston 151. The piston 151 is not provided with any ports or passages and is therefore closed against any flow of fluid between opposite sides of the piston.

The closure member 170 is provided with oppositely acting flow control valves 180 and 185 to control flow of hydraulic fluid between chambers 171 and 165 for shock absorption control.

An inlet line 197 is provided in the closure member 135 through which hydraulic fluid under pressure is introduced or exhausted to and from the chamber 165 for regulating the volume of hydraulic fluid in the chamber 165, which when placed under a predetermined pressure from the air medium introduced into the chamber 145, with a predetermined load applied to the suspension unit, will dispose the piston 151 in the cylinder 150 in substantially a mid position in the cylinder 150 as illustrated in the drawing.

The foregoing suspension unit is more particularly disclosed and described in the copending application of George W. Jackson, Serial No. 500,444 filed April 11, 1955 assigned to the common assignee.

Referring to Figure 1, a control device 10 is mounted upon the chassis 11 of a vehicle, the chassis being supported above the axle 12 by means of hydro-pneumatic air springs 13 and 14 of the type heretofore described. The hydro-pneumatic springs 13 and 14 are carried between a beam 15 supported on the axle 12 and the vehicle chassis 11.

When the air chamber 145 of the suspension units 13 and 14 is charged with air under pressure at a predetermined value with a predetermined volume of hydraulic fluid in chambers 171 and 165, the chassis 11 of the vehicle will be supported above the axle 12 at a predetermined clearance height. However as the load on the chassis 11 increases, the air in the chamber 145 is further compressed and the chassis will move downwardly toward the axle, and upon a decrease in load the compression on the air will be released and the chassis 11 will move upwardly relative to the axle.

The control device 10 is provided to supply oil under pressure to the chambers 171 and 165 of the suspension units 13 and 14 in response to an increase of load on the chassis 11, as indicated by a decrease in clearance height between the chassis 11 and the axle 12 and to exhaust oil from the springs 13 and 14 when the load decreases on the chassis 11 as represented by an increase of clearance height between the chassis 11 and the axle 12.

The control device 10 is supplied with oil under pressure from a pressure reservoir 16, a pipe line 17 connecting the reservoir with the control valve 10. Oil under pressure is supplied to the reservoir by a suitable pump (not shown) that may be driven by the engine of the vehicle, or driven in any other suitable manner.

The control valve 10 is connected with the springs 13 and 14 by means of a supply line 18, a supply line 19 connecting the spring 13 with the spring 14 for concurrent supply of oil to and exhaust of oil from the springs. A supply line 18a connects the control mechanism 10 with similar hydro-pneumatic springs on the opposite side of the vehicle.

The control mechanism 10 is operated by a lever 20 that in turn is connected with the axle 12 through a link 21 that connects with a rigid arm 22 secured to the axle 12. Motion of the axle 12 relative to the chassis 11 will cause oscillation of the lever 20 about its pivot 23.

The control mechanism 10 comprises a body 25 having a longitudinally extending bore 26 therein. The bore 26 communicates with a cylinder chamber 27 at one end of the body. A slide valve 30 having an end portion 31 forming a valve portion and an end portion 32 forming a drive portion is disposed with valve portion 31 within the bore 26.

The drive portion 32 of the slide valve 30 is slidably received in a bore 33 provided in a reciprocable member 34 that has a cylindrical end portion 35 slidable and reciprocable in a bore 36 provided in a housing cap 37 secured to the housing 25 by means of bolts 28.

The slide valve 30 has an enlargement 38 between the valve end portion 31 and the drive end portion 32, the enlargement 38 forming a piston slidable in the housing bore 27, the piston 38 forming a dampening device to restrain reciprocal movement of the slide valve 30.

The valve end portion 31 of the slide valve 30 has an annular recess 39 that connects with a fluid inlet passage 40 which in turn connects with a fluid inlet passage 41 connecting with the inlet port 42. A check valve 43 is provided in the inlet port 41.

A fluid outlet passage 45 is provided in the housing 25 at one side of the annular recess 39 in the slide valve 30, the port 45 being offset relative to the port 40 so that fluid under pressure will not be supplied to the port 45 when the valve end portion 31 is in the position illustrated in Figure 2. The fluid outlet passage 45 connects with an outlet port 46, a check valve 47 being provided in the outlet passage 45.

The port 46 connects with the line 18, as shown in Figure 1, so that oil under pressure supplied through the passages 40 and 45 will be delivered to the chamber 165 of the hydro-pneumatic springs 13 and 14.

The chamber 48 containing the check valve 47 has a port 49 receiving a check valve 50 located in the check valve chamber 51. The check valve 50 permits flow of fluid from the check valve chamber 48 into the check valve chamber 51 but prevents reverse flow of fluid. The check valve chamber 51 is connected by a passage 52 with the valve bore 26 and is axially offset relative to the end 53 of the slide valve 30 to prevent fluid flow from the springs 13 and 14 through the passages 49 and 52 when the slide valve 30 is in the position illustrated in Figure 2.

The valve bore 26 is connected with an exhaust port 55 through a check valve 56 that permits flow of fluid from the valve bore 26 into the exhaust port 55 for return to the oil pump or a sump, but prevents any return flow of fluid.

The supply port 46 connected with the line 18 supplies oil under pressure to the hydro-pneumatic springs 13 and 14 on one side of the motor vehicle, and also provides part of a passage for exhaust of oil from the springs. Similarly, oil is supplied to the springs on the opposite side of the motor vehicle through a supply passage 45a that has a check valve in the passage comparable to the valve 47. Similarly, an exhaust or return passage 52a, similar to passage 52, provides for connection of the hydro-pneumatic springs on the opposite side of the vehicle with the valve bore 26 for exhaust of oil from the springs, the passage 52a connecting with the passage 45a in the same manner through a check valve arrangement like the check valve 50. Thus both the supply ports 45 and 45a and the exhaust passages 52 and 52a are similarly arranged and are provided with similarly acting check valves.

The slide valve 30 is reciprocable in the valve bore 26 to control the flow of oil under pressure from the passage 40 into the passages 45 and 45a and exhaust of oil from the passages 52 and 52a into the valve bore 26 and thus to the exhaust port 55. The slide valve 30 is reciprocated by means of the reciprocable drive member 34.

The reciprocable drive member 34 consists of the piston 35 that is slidable in the bore 36 of the cap 37. The piston 35 has peripherally extending slots 60 on opposite sides thereof that are aligned to receive the crank pin 61 that is eccentrically extending from the pivot shaft 23 that is journaled in the bore 62 of the cap 37. The pivot shaft 23 has the shaft portion 63 extending therefrom on which the lever 20 is secured to effect oscillation of the pivot shaft 23 and thereby effect oscillation of the crank pin 61 within the slots 60 of the piston 35. The crank pin 61 is retained in engagement with the slots by means of a member 64 held in resilient engagement with the crank pin by means of the spring 65. A wear plate 66 is provided on the opposite side of the crank pin 61.

The reciprocable device 34 supports a pair of radially positioned plungers 70 each of which reciprocates in a radial bore 71 providde in radial bosses 72 projecting from diametrically opposite sides of the device 34. Each of the plungers 70 carries a ball 75 that engages an annular recess 77 forming cam surfaces 77a and 77b of equivalent angle of inclination provided in the drive end portion 32 of the slide valve 30. Each of the plungers 70 is spring urged radially toward the axis of the spool valve 30 by means of compression springs 76. The cam surfaces 77a and 77b are inclined sharply from a central dwell surface 77c to provide for a rapid increase of force on the spool valve 30 to move the same.

If the spool valve 30 were allowed to be free for reciprocal movement in the bore 26, obviously, reciprocal movement of the reciprocable device 34 as effected by oscillation of the crank pin 61 would effect equivalent reciprocal movement of the spool valve 30. This reciprocal movement of the spool valve, if free and unrestrained would thus reflect road movements caused the axle 12 by irregularities of road surface. The result would be that oil would be supplied continuously to the springs 13 and 14 or exhausted therefrom in response to road surface irregularities. Such action is not desirable as the body of the vehicle would constantly be shifting its clearance height relative to the axle 12.

To prevent this action the damping piston 38 is provided in the cylinder chamber 27. The damping piston 38 divides the cylinder chamber 27 into two chambers 27a and 27b interconnected through a resistance valve 78 that restricts flow of oil in either direction between the chambers 27a and 27b. The chamber 27b has an end closure wall 79 retained in position by a spring disk 80 having a plurality of spring fingers engaging the closure wall. The resistance valve 78 is adjustable by the screw portion 81 to change the effective resistance of the passage between the damping chambers 27a and 27b.

The slide valve 30 is provided with an axial bore 85 that has radial passages 86 to provide for exhaust of oil from the chamber 87 in the cap 37 and thereby prevent build-up of pressure within the device. Radial passages 87' are provided in the slide valve 30 between the pressure inlet passage 40 and the chamber 27a of the dampening device to prevent pressure from the passage 40 passing into the dampening chambers 27a and 27b and effecting a pressure build-up in these chambers.

When the vehicle is stationary, the oil volume in the chambers 165 and 171 of the hydro-pneumatic springs 13 and 14 is such that the air pressure in the chamber 145 resiliently supports the piston 151 in its engagement with the oil body to establish a predetermined clearance height between the chassis 11 and the axle 12, the slide valve 30 being in the position shown in Figure 2. At this time the balls 75 of the reciprocable device 34 ride on the dwell surface 77c between the cam surfaces 77a and 77b. If a load in the vehicle should be increased while the vehicle is standing still, oscillation of the crank pin 61 in either a left or right hand direction as viewed in Fig. 2 will cause reciprocal movement of the reciprocable device 34 in one direction or the other depending upon the direction of oscillation of the crank pin 61. This reciprocal movement of the device 34 will displace the balls 75 to one side or the other of the center of the recess 77 thereby lifting the plungers 70 against the springs 76. Such action will cause the balls 75 to move over the surface 77a or 77b to effect recentering of the balls at the center of the recess 77 in the dwell portion 77c. Thus if reciprocal movement of the device 34 is in a left hand direction, the slide valve 30 will be moved in a left hand direction a corresponding amount. Such movement will align the recess 39 in the slide valve 30 with the passage 45 and provide for delivery of oil under pressure from the inlet port 42 through the passage 40 into the passage 45 and thence through the port 46 to the line 18 connected with the springs 13 and 14 to supply oil under pressure to the springs. This is the result occasioned when the load is increased in the vehicle to provide for an increase of oil volume to counter-balance increased compression of air in the chamber 145 of the springs 13 and 14 resulting from the increased load, and thereby return the chassis 11 to a predetermined clearance height relative to the axle 12.

Reverse operation is obtained when the chassis 11 tends to rise relative to the axle 12 upon elimination of the load, the increased air pressure in the chamber 145 of the springs tending to lift the chassis 11 to a greater height clearance than the predetermined established distance. Under this condition the crank pin 61 will be moved in a right hand direction to effect corresponding movement of the device 34 with the result that the drive balls 75 will move the slide valve 30 in a right hand direction to position the end wall 53 of the slide valve in alignment with the exhaust port 52 to provide for exhaust of oil from the springs 13 and 14 through the port 46 and passages 49 and 52 into the valve bore 26 and thence exhaust out of the exhaust port 55. The exhaust of oil continues until sufficient pressure is relieved on the air in the chamber 145 of the springs to allow the chassis 11 to settle to its predetermined height relationship relative to the axle 12 at which the valve elements are again in the position shown in Figure 2.

The foregoing action occurs against resistance movement of the damping device comprising the piston 38 in the cylinder bore 37, the continued urgence of the slide valve in a right or left hand direction by the balls 75 riding to the right or left hand side of the radial center of the cam surfaces 77 ultimately, upon a three to five second delay, overcoming the resistance to movement of fluid between the damping chambers 27a and 27b to allow the piston 38 to move in one direction or the other according to the direction of urgence effected by the position of reciprocation of the reciprocable device 34.

Since the dampening device 38, 27 provides for a resistance to reciprocal movement of the slide valve 30 it will be apparent that movement of the axle 12 resulting from road surface roughness will not affect the position of the slide valve 30. The average movements of the balls 75 alternately on opposite sides of the radial center of the recess 77 will be equalized, and since the dampening device resists movements of the valve 30 and the driving movements of the balls against the valve 30, the average result of vibratory and temporary forces due to vibration-causing and temporary road surface roughness will have the effect of retaining the balls 75 on radial center between cam surfaces 77a and 77b. The balls 75 in cooperating with cam surfaces 77a and 77b on valve 30 provides a yieldable drive connection having an inherent self-centering action and force which is supplemental to resistance to movement that damping device 38, 27 provides. Flow control valves 180 and 185 of suspension unit S govern flow of hydraulic fluid between chambers 171 and 165 for shock absorption control.

However, should there be a more permanent change in clearance height such as would be due to an increase in load or an oil leak from the springs 13 and 14 during operation of the vehicle with the result that the average position of the chassis 11 is of less clearance height than that which is the normal predetermined clearance height, the average position of the balls 75 will be leftward of the position shown in Figure 2. This will result in a prolonged urgence of the valve 30 in a left hand direction by the crank pin 61 and reciprocable drive member 34 through the yieldable drive connection of balls 75 on cam surface 77a to an extent that the dampening device 27, 38 will allow the valve to move in a left hand direction for supply of oil to the springs 13 and 14 until such time as the additional quantity of oil under pressure is sufficient to return the chassis 11 to its pre-established clearance height, this action resulting in a reverse movement of the crank pin 61 will cause the reciprocable device 34 to move in a right hand direction and return the valve 30 to the position shown in Fig. 2. Conversely, with a positive change in clearance height such as would be due to a decrease in load, there will result a prolonged urgence of the valve 30 in a right hand direction by the crank pin 61 and reciprocable drive member 34 through the yieldable drive connection of balls 75 on cam surface 77b to an extent that the damping device 27, 38, will allow the valve to move in a right hand direction for exhaust of oil from the springs 13 and 14 until such time as the additional quantity of oil removed is sufficient to result in return of chassis 11 to its pre-established clearance height; this action, resulting in a reverse movement of the crank pin 61, will cause the reciprocable device 34 to move in a left hand direction and return the valve 30 to the position shown in Figure 2.

While the form of embodiment of the invention as herein disclosed constitutes a preferred form, it is to be understood that other forms might be adopted as may come within the scope of the claims which follow.

What is claimed is as follows.

1. Control mechanism for regulating flow of fluid under pressure to and from a pressure chamber, a housing containing a slide valve, port means in said housing with which said valve cooperates to effect controlled flow of fluid through said housing in two selective directions on movement of said valve selectively in opposite directions relative to said port means, a reciprocable device in said housing, oscillatable crank means engaging said reciprocable device reciprocably driving the same on oscillation of the crank means, said reciprocable device including resilient means engaging a cam surface on said valve to drivingly reciprocate said valve by such engagement and provide for relative reciprocal movement between said device and said valve, and a movement dampening device on said valve to restrain movement of the valve against opening of the port means by said reciprocable device through said resilient means so long as reciprocal movements of said reciprocable device in opposite directions of the center of the cam surfaces are equalized in extent and are of a time duration less than the delay time effected by the dampening device.

2. Control mechanism for regulating flow of fluid under pressure to and from a pressure chamber, a housing containing a slide valve, port means in said housing with which said valve cooperates to effect controlled flow of fluid through said housing in two selective directions on movement of said valve selectively in opposite directions relative to said port means, a reciprocable device in said housing, oscillatable crank means engaging said reciprocable device reciprocably driving the same on oscillation of the crank means, said reciprocable device including resilient means engaging a cam surface on said valve to drivingly reciprocate said valve by such engagement and provide for relative reciprocal movement between said device and said valve, and a movement dampening device on said valve to restrain movement of the valve against opening of the port means by said reciprocable device so long as reciprocal movements of said reciprocable device through said resilient means in opposite directions of the center of the cam surfaces are equalized in extent and are of a time duration less than the delay time effected by the dampening device, said reciprocable device effecting selective movement of the dampening device and thereby causing movement of said valve in one direction or the other on extended average movement of said reciprocable device to one side of the center of the cam surfaces or the other.

3. Control mechanism for regulating flow of fluid under pressure to and from a pressure chamber, a housing containing a slide valve, port means in said housing with which said valve cooperates to effect controlled flow of fluid through said housing in two selective directions on movement of said valve selectively in opposite directions relative to said port means, a reciprocable device in said housing, oscillatable crank means engaging said reciprocable device reciprocably driving the same on oscillation of the crank means, said reciprocable device including resilient means engaging oppositely inclined cam surfaces of equivalent angle of inclination on said valve to drivingly reciprocate said valve by such engagement and provide for relative reciprocal movements between said device and said valve, and a movement dampening device on said valve to restrain movement of the valve against opening of the port means by said reciprocable device so long as reciprocal movements of said reciprocable device in opposite directions of the center of the cam surfaces are equalized in extent and are of a time duration less than the delay time effected by the dampening device.

4. Control mechanism for regulating flow of fluid under pressure to and from a pressure chamber, comprising, a housing containing a slide valve, port means in said housing with which said valve cooperates to effect controlled flow of fluid through said housing in two selective directions on movement of said valve selectively in opposite directions relative to said port means, a reciprocable device in said housing on the axis of said valve, oscillatable crank means engaging said reciprocable device reciprocably driving the same on its axis on oscillation of the crank means, said reciprocable device including resilient means angular to the axis of the reciprocable device and resiliently engaging oppositely inclined cam surfaces of equivalent angle of inclination on said valve to drivingly reciprocate said valve by such engagement and provide for relative reciprocal movement between said device and said valve, and a movement dampening device on said valve to restrain movement of the valve against opening of the port means by said reciprocable device so long as reciprocal movements of said reciprocable device in opposite directions of the radial center of the cam surfaces are equalized in extent and are of a time duration less than the delay time effected by the dampening device, said reciprocable device effecting selective movement of the dampening device and thereby causing movement of said valve in one direction or the other on average movements of said reciprocable device having the effective center of the movement to one side or the other of the radial center of the cam surface.

5. Control mechanism for regulating flow of fluid under pressure to and from a pressure chamber, comprising, a housing containing a slide valve, said slide valve having a valve portion and a drive portion, said drive portion having oppositely inclined cam surfaces of equivalent angle of inclination therein, port means in said housing with which said valve portion cooperates to effect controlled flow of liquid through said housing in two selective directions on movement of said valve selectively in opposite directions relative to said port means, a reciprocable device in said housing at the drive portion end of said valve means with the axis of the said device on the axis of the valve means, oscillatable crank means engaging said reciprocable device reciprocably driving the same on its axis on oscillation of the crank means, said reciprocable device including resilient means angular to the axis of the reciprocable device and said valve means resiliently engaging said cam surfaces on said drive end portion of said valve to drivingly reciprocate said valve by such resilient engagement and provide for relative reciprocable movement between said reciprocable device and said drive portion of said valve, and a movement dampening device on said valve between said valve portion and drive portion thereof to restrain movement of the valve against opening of the port means by said reciprocable device so long as reciprocal movements of said reciprocable device are resolved from forces in opposite directions to a resultant force directed toward the radial center of the cam surface and are equalized in extent and are of a time duration less than the delay time effected by the dampening device, said reciprocable device effecting selective movement of the dampening device and thereby said valve in one direction or the other on average movements of said reciprocable device having the effective center of the movements to one side or the other of the radial center of the cam surface.

6. Control mechanism for regulating flow of fluid under pressure to and from a pressure chamber, comprising, a housing containing a slide valve, said slide valve having a valve portion and a drive portion, said drive portion having oppositely inclined cam surface of equivalent angle of inclination therein, port means in said housing with which said valve portion cooperates to effect controlled flow of fluid through said housing in two selective directions on movement of said valve selectively in opposite directions relative to said port means, a reciprocable device in said housing at the drive portion end of said valve means with the axis of the said device on the axis of the valve means, oscillatable crank means engaging said reciprocable device reciprocably driving the same on its axis on oscillation of the crank means, said reciprocable device including resilient means angular to the axis of the reciprocable device and said valve means resiliently engaging said cam surfaces on said drive end portion of said valve to drivingly reciprocate said valve by such resilient engagement and provide for relative reciprocable movement between said reciprocable device and said drive portion of said valve, said valve means having a portion thereof between said valve portion and said drive portion provided with an enlargement forming a piston slidable in a cylinder chamber in said housing provided with resistance flow passage means between opposite ends of said chamber and forming thereby dampening means to restrain movement of the valve means by said reciprocable device, said reciprocable device having a range of longitudinal reciprocation of equal extent in opposite directions of the radial center of the cam surfaces on said valve means as effected by a range of oscillation of said crank means, said crank means having ranges of oscillation on either side of its center of oscillation that extend beyond the said range to effect a change in the range of reciprocal movement of said reciprocable device relative to the radial center of said cam surfaces whereby to effect reciprocal movement of said valve means.

References Cited in the file of this patent

UNITED STATES PATENTS

| | | |
|---|---|---|
| 1,560,439 | Trenor | Nov. 3, 1925 |
| 2,579,084 | Krotz | Dec. 18, 1951 |
| 2,620,182 | Marston | Dec. 2, 1952 |